United States Patent
Yamada et al.

(10) Patent No.: US 8,241,695 B2
(45) Date of Patent: Aug. 14, 2012

(54) PROCESS FOR PRODUCING FAT AND OIL COMPOSITION FOR DEEP-FRYING WITH SUPERIOR HEAT STABILITY

(75) Inventors: Yuzo Yamada, Kanagawa (JP); Takehiko Sekiguchi, Shizuoka (JP); Keiko Awae, Kanagawa (JP); Masami Inoue, Kanagawa (JP); Shouji Matsumoto, Kanagawa (JP); Hiroshi Shiramasa, Kanagawa (JP)

(73) Assignee: J-Oil Mills, Inc. (JP)

( * ) Notice: Subject to any disclaimer, the term of this patent is extended or adjusted under 35 U.S.C. 154(b) by 330 days.

(21) Appl. No.: 12/674,931

(22) PCT Filed: Aug. 27, 2008

(86) PCT No.: PCT/JP2008/002316
§ 371 (c)(1), (2), (4) Date: Feb. 24, 2010

(87) PCT Pub. No.: WO2009/028175
PCT Pub. Date: Mar. 5, 2009

(65) Prior Publication Data
US 2011/0059222 A1      Mar. 10, 2011

(30) Foreign Application Priority Data
Aug. 29, 2007   (JP) .................................. 2007-222166

(51) Int. Cl.
*A23D 9/007*       (2006.01)

(52) U.S. Cl. ...................... 426/610; 426/330.6; 426/438
(58) Field of Classification Search .................. 426/610, 426/330.6, 438
See application file for complete search history.

(56) References Cited

U.S. PATENT DOCUMENTS

| | | | | |
|---|---|---|---|---|
| 4,524,085 A | * | 6/1985 | Purves et al. | 426/601 |
| 4,528,201 A | * | 7/1985 | Purves | 426/262 |
| 4,560,569 A | * | 12/1985 | Ivers | 426/549 |
| 4,608,264 A | * | 8/1986 | Fan et al. | 426/438 |
| 6,733,814 B2 | * | 5/2004 | 't Hooft et al. | 426/604 |
| 2004/0109930 A1 | * | 6/2004 | 't Hooft et al. | 426/607 |
| 2008/0008787 A1 | * | 1/2008 | Kincs et al. | 426/89 |

OTHER PUBLICATIONS

Gutfinger, T. 1978. Journal of the American Oil Chemist Society 55:856.*

* cited by examiner

*Primary Examiner* — Carolyn Paden
(74) *Attorney, Agent, or Firm* — Galbreath Law Offices, P.C.; John A. Galbreath

(57) ABSTRACT

Disclosed is a process for producing a fat and oil composition for deep-frying, which has superior flavor and is suppressed, for a long time, in color development and unfavorable odor during heating. Specifically disclosed is a process for producing a fat and oil composition for deep-frying, which is characterized in that at least one phosphorus-derived component selected from a crude oil or a partially refined fat and oil, is added into a refined edible fat and oil in such an amount that the phosphorus content is within the range of 0.1 to 5.0 ppm.

1 Claim, No Drawings

PROCESS FOR PRODUCING FAT AND OIL COMPOSITION FOR DEEP-FRYING WITH SUPERIOR HEAT STABILITY

BACKGROUND OF THE INVENTION

1. Field of the Invention

The present invention relates to a novel process for producing a fat and oil composition for deep-frying. The present invention particularly relates to a process for producing a fat and oil composition for deep-frying by which the fat and oil is suppressed in deterioration during heating and cooking, in particular color development and unfavorable odor during heating, and deep fried food or the like has an improved crisp.

2. Description of the Related Art

As oil for cooking deep fried food such as fried foods or Tempura (Japanese dish made of battered and deeply fried seafood or vegetables), liquid oils such as soybean oil and rapeseed oil are used. These kinds of liquid oils are low-cost and can be handled favorably but cause color development, increased viscosity, unfavorable cooked odor or the like during heating and cooking. Promotion of the deterioration of liquid oil causes the worsening of the quality of the deep fried food, thus preventing the liquid oil from being used for a long time.

As a related art for suppressing the color development by heating during deep-frying by using liquid oil, a method has been used to enhance the refining conditions in order to minimize phospholipid, Fe component or the like known as a substance that promotes the deterioration of fat and oil during heating. However, the current refining conditions of liquid oil are significantly enhanced already. Thus, enhancing the refining conditions any more may worsen the fat and oil on the contrary.

In order to improve the heat stability of fat and oil, a technique for blending emulsifier or the like, a transesterification technique, and a technique for subjecting oil bearing seeds to hybridization, mutation, gene recombination or the like have been suggested to provide an arbitrary fatty acid composition. However, such techniques require a high cost and may require a new obligation to indicate an additive or the like.

As a method for allowing a certain amount of phosphorus-derived components in fat and oil, Japanese Unexamined Patent Application Publication No. 2006-121990 (Patent Document 1) suggests a method for refining crude oil by degassing and dehydration process under reduced pressure without subjecting the crude oil to a degumming process. On the other hand, Japanese Unexamined Patent Application Publication No. S58-194994 (Patent Document 2) suggests a method for subjecting crude oil to an ultrafiltration membrane instead of a conventional degumming process to remove impurities such as phospholipid without using an agent or the like. Japanese Unexamined Patent Application Publication No. H9-157687 (Patent Document 3) suggests a method for directly subjecting degummed or neutralized oil of soybean oil, rapeseed oil or corn oil to deodrization process to obtain a fat and oil composition having a radical scavenging activity and having a low degree of refining. These methods are tried for a totally different objective.

According to the method of Patent Publication 1, phospholipid as a phosphorus-derived component can be caused to remain in a large amount. However, this method is for a fat and oil processed food. Since it is generally clear that a very high amount of phospholipid of a few percent causes a significant color development (brownish discoloration) of the fat and oil during heating and cooking, this method cannot be used for an application for deep-frying or the like. Regarding the relation between the phosphorous component and the phospholipid content, oil bearing seeds generally include phospholipid of a molecular weight of about 750 to 800. Since phosphorus has an atomic weight of 31, an about 25 times-larger-amount of phosphorus content corresponds to phospholipid.

In the case of the method of Patent Document 2, phospholipid as a phosphorus-derived component remains in a certain amount. However, this method requires a high cost and thus is not suitable for mass production with a low cost. Furthermore, the functionality in the cooking with heat does not show, as shown in the Example, a particular improvement in the quality compared to the conventional product. In the case of the method of Patent Document 3, a bleaching process for refining fat and oil is omitted and thus phosphorus-derived components remain in a large amount. However, components known as promoting photooxidation (e.g., chlorophyll) also tend to remain, thus causing a risk of an adverse effect on the preservative quality of the fat and oil and the fat and oil foods. As described above, the methods according to the conventional techniques cannot suppress the color development by heating of a fat and oil composition for deep-frying.

Patent Document 1: Japanese Unexamined Patent Application Publication No. 2006-121990

Patent Document 2: Japanese Unexamined Patent Application Publication No. S58-194994

Patent Document 3: Japanese Unexamined Patent Application Publication No. H9-157687

SUMMARY OF THE INVENTION

In view of the above, it is an objective of the present invention to provide a process for producing a fat and oil composition by which, the color development by heating, which has been a conventional disadvantage in the fat and oil for deep-frying, is suppressed to thereby provide a favorable crisp to foods cooked with oil and to allow the fat and oil composition to be used for a long period.

Through a devoted research for achieving the above objective, the present inventors have found that one of substances that suppresses the color development by heating of edible oil is a phosphorous component and that this component remaining in the edible oil in a very small amount can improve the heat stability. Specifically, the present invention provides a process for producing a fat and oil composition for deep-frying that has a superior heat stability at 180 degrees C., comprising a step of adding, to refined edible fat and oil, at least one type of a phosphorus-derived component selected from a crude oil and a partially refined fat and oil so that a phosphorous content is 0.1 to 5.0 ppm. Conventionally, phospholipid from which a phosphorous component is derived has been considered as a causing factor of the deterioration of a fat and oil during heating. Thus, it is very surprising that the color development by heating of a fat and oil can be suppressed by adding, according to the present invention, a very small amount of a phosphorous component to the fat and oil.

The crude oil herein means that obtained from oil bearing materials by a method such as oil expression, extraction, or prepress and solvent extraction. The partially refined fat and oil herein means a degummed oil, a partially refined oil for which only a neutralization process is omitted, or the like.

The term "phosphorus-derived component" herein means a component that includes phosphorus and that is used as material of a fat and oil composition for deep-frying of the present invention.

According to the fat and oil composition obtained by the present invention, since the edible fat and oil includes a phosphorous component in a range from 0.1 to 10.0 ppm, the conventional disadvantages of the stability of the fat and oil during heating and cooking, in particular color development by heating and unfavorable odor during heating, are solved. This effect continues significantly longer than in the case of the conventional fat and oil composition. Thus, the fat and oil composition obtained by the present invention is optimal for a fat and oil composition for deep-frying which requires a heat stability for a long period.

The fat and oil composition for deep-frying obtained by the present invention also provides an effect according to which deep fried foods cooked therewith have an improved appearance and crisp.

In the process according to the present invention, a phosphorus-derived component is added to refined edible fat and oil to thereby produce a fat and oil composition for deep-frying having the above effect in a low-cost and simple manner.

DESCRIPTION OF THE PREFERRED EMBODIMENTS

The edible fat and oil used in the present invention is a base oil component. The type of oil is not limited and may be any edible oil. Specific examples include vegetable oil such as rapeseed oil, soybean oil, corn oil, olive oil, sesame oil, safflower oil, sunflower oil, cottonseed oil, rice bran oil, coconut oil, or palm oil or the like. Edible fat and oil may be used singularly or two or more edible fat and oils also may be blended. Among them, rapeseed oil and soybean oil are preferred and rapeseed oil or rapeseed oil-containing fat and oil are particularly preferred.

The above edible oil can be produced by subjecting the oil bearing materials to oil expression process and/or solvent extraction process to obtain crude oil which is further subjected to extraction and refining.

The oil expression is a process to apply a high pressure to oil bearing materials to express the oil from cells. The oil expression is suitable for vegetable materials having a relatively large oil content such as sesame.

The solvent extraction is a process in which residues remained after roll pressing or oil expression process of oil bearling seeds as raw material are caused to have a contact with a solvent to extract oil in a solution with the solvent and the solvent is distilled away from the remaining solution to obtain the oil. The solvent extraction is suitable for raw materials having a small oil content such as soybeans. The solvent includes hexane or the like.

A refining means can be a general refining process of vegetable oil. Specifically, impurities are removed in an order of (extracted oil) crude oil, degummed oil, neutralized oil, bleached oil, and deodorized oil (refined oil) among which steps such as "degumming process", "neutralization process", "bleaching process", and "deodorization process" are performed by general degumming process, neutralization process, deodorization process or the like.

The degumming process is a step of hydrating and removing gums including phospholipid as a main component included in oil. The neutralization process is a step of performing a processing with alkaline water to thereby remove free fatty acid included in oil as soap stock.

The bleaching process is a step of absorbing pigments included in oil activated clay.

The deodorization process is a step of performing a steam distillation under reduced pressure to thereby remove a volatile odor-active component included in oil. With regard to olive, sesame, safflower and sunflower, a crude oil subjected to the oil expression and/or solvent extraction or the crude oil subjected to a simple water-washing processing may be served as edible oil.

A component from which a phosphorous component is derived, which is included in the fat and oil composition of the present invention, is fat and oil including, as described later, various phosphorous components such as crude oil or degummed oil. The type of fat and oil of the crude oil or the degummed oil is not limited to a particular type and also may be a substance other than edible fat and oil.

The phosphorous content in the present invention is 0.1 to 10.0 ppm and is preferably 0.1 to 5.0 ppm. The phosphorous content lower than 0.1 ppm causes an insufficient effect of suppressing the color development by heating. The phosphorous content higher than 10 ppm on the contrary promotes the color development by heating.

The fat and oil composition of the present invention needs to include a phosphorous content of 0.1 to 10 ppm. Thus, a phosphorus-derived component is added to refined edible fat and oil (i.e., fat and oil that are subjected to steps up to the deodorization process and that include no phosphorous component). The method of adding a phosphorus-derived component to refined edible fat and oil is preferred in that a minute amount of phosphorous component can be adjusted easily.

The phosphorus-derived component can be used at least one selected from the group consisting of a crude oil obtained by oil expression, extraction, prepressed and solvent extraction or the like, and a partially refined fat and oil such as a degummed oil or a partially refined oil for which only a neutralization process is omitted. The phosphorus-derived component is preferably expressed and/or extracted oil or degummed oil.

EXAMPLES

Hereinafter, the present invention will be described in further detail by describing examples and comparison examples. However, the following examples do not limit the present invention. The term "part(s)" herein means part(s) by weight.

Examples 1 to 3

To refined rapeseed oil produced through a general refining process (product name: NATANE SHIRASHIMEYU made by J-OIL MILLS, INC., a phosphorous component of 0.0 ppm, chlorophyll of 0.0 ppm), rapeseed crude oil as a phosphorus-derived component (crude oil obtained through oil expression and solvent extraction) or degummed rapeseed oil (oil obtained by adding water to oil subjected to oil expression to hydrate and remove the gums including phospholipid as a main component) was added at ratios shown in Table 1 to thereby prepare fat and oil compositions for deep-frying. The phosphorous components in Table 1 show the results of the analysis of the fat and oil compositions obtained by the addition of the phosphorus-derived components. Phosphorous components were analyzed by inductively coupled plasma (ICP) spectroscopy. Chlorophyll was analyzed by absorption spectrophotometry (Standard Methods for the Analysis of Fats, Oils and Related Materials).

The fat and oil composition was subjected to the following heat stability test. 600 g of fat and oil were filled in a porcelain dish and were heated at 180 degrees C. for 80 hours. After 20, 40, 60, and 80 hours from the start of the heating, the oil was sampled and the oil color values were measured. The color values were measured by a Lovibond tintometer with a one-inch cell, and that shown as a 10R+Y value.

In Example 3, unfavorable odor during heating was measured by subjecting the fat and oil heated at 180 degrees C. for 80 hours to the sensory evaluation by 12 panelists with regard to the odor. The evaluation was performed for the three evaluation items of the overall odor level, the irritating odor level, and the level of deterioration odor based on the following criteria.

Gauge Points
5.0: Very strong odor
4.0: Strong odor
3.0: Average odor
2.0: Subtle odor
1.0: Very small odor
0.0: No odor Comparison Example 1

Except for that only refined rapeseed oil was used in Example 1, a heat stability test was performed based on the same procedure as that in Example 1, the result is shown in Table 1. The unfavorable odor during heating was also measured based on the same procedure as that in Example 3, the result is shown in Table 1.

TABLE 1

|  |  | Comparison example 1 | Example 1 | Example 2 | Example 3 |
|---|---|---|---|---|---|
| Raw material (part(s)) | Refined rapeseed oil | 100 | 99.5 | 99.5 | 99.0 |
|  | Crude rapeseed oil | — | 0.5 | — | — |
|  | Degummed rapeseed oil | — | — | 0.5 | 1.0 |
| Composition | Phosphorous component (ppm) | 0.0 | 1.9 | 0.6 | 1.2 |
|  | Chlorophyll (ppm) | 0.0 | 0.07 | 0.05 | 0.10 |

TABLE 1-continued

|  |  | Comparison example 1 | Example 1 | Example 2 | Example 3 |
|---|---|---|---|---|---|
| Oil color values | After 0 hour from start of heating | 0.9 | 2.0 | 0.8 | 0.9 |
|  | After 20 hours from start of heating | 12.0 | 7.4 | 11.4 | 9.6 |
|  | After 40 hours from start of heating | 34.0 | 20.2 | 26.0 | 26.0 |
|  | After 60 hours from start of heating | 130.0 | 38.0 | 49.0 | 47.0 |
|  | After 80 hours from start of heating | 188.0 | 84.0 | 93.0 | 95.0 |
| Sensory evaluation | Level of overall odor | 3.2 | — | — | 2.8 |
|  | Level of irritating odor | 2.6 | — | — | 2.0 |
|  | Level of deterioration odor | 1.0 | — | — | 0.9 |

When the sensory evaluation of Comparison example 1 is compared with that of Example 3 in Table 1, the fat and oil composition of the present invention shows superior results in all of the level of overall odor after heating, the level of irritating odor, and the level of deterioration odor.

Examples 4 and 5 and Comparison Examples 2 to 4

Except for that the additive amount of degummed rapeseed oil was changed in Example 2, the same procedure was used to prepare a fat and oil composition for deep-frying. The heat stability test was performed by filling 10 g of the composition in a stainless steel dish (diameter of 5 cm) and heating the composition at 180 degrees C. for 7.5 hours. After the heating, the oil color values were measured. The color values were measured by a Lovibond tintometer with a one-inch cell, and shown as a 10R+Y value.

TABLE 2

|  |  | Comparison Example 1 | Comparison Example 2 | Comparison Example 3 | Comparison Example 4 | Example 4 | Example 5 |
|---|---|---|---|---|---|---|---|
| Raw material (part(s)) | Refined rapeseed oil | 100 | 99.96 | 91.50 | 50.20 | 99.92 | 96.20 |
|  | Degummed rapeseed oil | 0 | 0.04 | 8.50 | 49.80 | 0.08 | 3.80 |
| Phosphorous content analysis value (ppm) |  | 0 | 0.05 | 11.1 | 65.0 | 0.1 | 4.9 |
| Oil color values after 7.5 hours from start of heating |  | 211 | 163 | 136 | 221 | 98 | 92 |

Reference Examples 6 to 9

To the refined rapeseed oil used in Example 1, a phosphorus-derived component of soybean lecithin (product name: Lecithin CL made by J-OIL MILLS, INC.), phosphoric acid (85%-solution made by Wako Pure Chemical Industries, Ltd.) or sodium dihydrogenphosphate dihydrate (made by Wako Pure Chemical Industries, Ltd.) was added to thereby prepare the fat and oil composition for deep-frying including the phosphorous components shown in Table 3.

The heat stability test was performed by filling 10 g of the composition in a stainless steel dish (diameter of 5 cm) and heating the composition at 180 degrees C. for 7.5 hours to measure the oil color values after the heating. The color values were measured by a Lovibond tintometer with a one-inch cell, and shown as a 10R+Y value.

TABLE 3

|  |  | Comparison example 1 | Reference example 6 | Reference example 7 | Reference example 8 | Reference example 9 |
|---|---|---|---|---|---|---|
| Raw material (parts) | Refined rapeseed oil | 100 | 100 | 100 | 100 | 100 |
|  | Soybean lecithin | — | 0.005 | 0.0025 | — | — |
|  | Phosphoric acid | — | — | — | 0.0006 | — |
|  | Sodium dihydrogen phosphate | — | — | — | — | 0.001 |
| Phosphorous content analysis value (ppm) |  | 0.0 | 1.0 | 0.5 | 5.0 | 2.0 |
| Oil color values after 7.5 hours from start of heating |  | 211 | 113 | 120 | 94 | 105 |

As can be seen from the results of Tables 1 to 3, the color development by heating was suppressed by the phosphorus-derived component added to the fat and oil composition.

Example 10

Frying Stability Test

A frying stability test was performed in which the fat and oil composition for deep-frying obtained by the present invention was used to actually cook deep fried foods. In this test, the fat and oil composition was used that was prepared with the same procedure except for that the additive amount of degummed rapeseed oil was changed in Example 2. As a comparison example, the fat and oil composition of Comparison example 1 was also subjected to the test.

With the above fat and oil composition, frozen fried chickens (product name: Japanese fried chicken made by AJINOMOTO FROZEN FOODS Co., Inc.) were subjected to the frying stability test. 16.5 kg of fat and oil was filled in a 20 L-fryer and was heated at 180 degrees C. for 10 hours par day to deep fry 10 kg of the fried chickens. The same operation as above was performed for 6 days. After 0, 20, 30, 40, 50, and 60 hours from the start of frying, the fat and oil was sampled and the oil color values were measured. The oil color values were measured by a Lovibond tintometer with a one-inch cell, and shown as a 10R+Y value. The result is shown in Table 4.

TABLE 4

|  |  | Comparison example 1 | Example 10 |
|---|---|---|---|
| Raw material (parts) | Refined rapeseed oil | 100 | 99.7 |
|  | Degummed rapeseed oil | — | 0.3 |
| Phosphorous content analysis value (ppm) |  | 0.0 | 0.39 |
| Oil color values | After 0 hour | 2.4 | 2.1 |
|  | After 10 hours | 12.0 | 9.2 |
|  | After 20 hours | 28.0 | 19.1 |
|  | After 30 hours | 45.0 | 33.0 |
|  | After 40 hours | 64.0 | 48.0 |
|  | After 50 hours | 100.0 | 71.0 |
|  | After 60 hours | 130.0 | 101.0 |

In Table 4, the color values of the fat and oil shown after 50 hours from the start of the frying of fried chickens by the conventional fat and oil composition are similar to that of the fat and oil composition of the present invention after 60 hours. Thus, it can be seen that the fat and oil composition of the present invention suppresses the color development by heating of the fat and oil for a longer period than in the conventional case. The heat stability for a long period as described above is very convenient for both of professional-use and household-use fat and oil compositions for deep-frying.

Example 11

Crisp Test

Refined soybean oil (phosphorous content of 0.0 ppm and chlorophyll of 0.0 ppm) and refined rapeseed oil (product name: SARASARA Canola Oil made by J-OIL MILLS, INC., phosphorous content of 0.0 ppm and chlorophyll of 0.0 ppm) that produced through a general refining process were blended at a weight ratio of 60:40. Then, this mixture of 97.5 parts by weight was blended with degummed rapeseed oil (oil obtained by adding water to oil expression oil to hydrate and remove the gums including phospholipid as a main component) of 2.5 parts by weight, thereby preparing a fat and oil composition for deep-frying. This composition included a phosphorous content of 2.0 ppm.

The above fat and oil composition was subjected to a Tempura cooking test and a sensory evaluation was performed. The sensory evaluation by Tempura was performed by filling the fat and oil composition of 600 g in a stainless steel pan to dip pieces of sweet potato cut to have a thickness of 5 mm in batter (product name: Nisshin Flour made by Nisshin Flour Milling INC. of 100 g, egg of about 60 g, and cold water of 150 g) to fry the cut potatoes at 180 degrees C. for 3 minutes. The sensory evaluation was performed by 13 panelists, the result of which is shown in Table 5.

Comparison Example 5

The fat and oil composition was prepared based on the same procedure except for that degummed rapeseed oil was not added in Example 11. This composition included a phosphorous content of 0 ppm. This fat and oil composition was subjected to the same sensory evaluation procedure as that in Example 11, the result is shown in Table 5.

TABLE 5

|  |  | Comparison example 5 | Example 11 |
|---|---|---|---|
| Raw material (part(s)) | Refined soybean oil | 60 | 58.5 |
|  | Refined rapeseed oil | 40 | 39.0 |
|  | Degummed rapeseed oil | — | 2.5 |
| Phosphorous content analysis value (ppm) |  | 0.0 | 2.0 |
| Sensory evaluation | Appearance (coating appearance) | ○ | ◎ |
|  | Smell | X | ○ |
|  | Crisp | X | ◎ |
|  | Oily taste | X | ○ |
|  | Flavor | ○ | ○ |
|  | Aftertaste | ○ | ○ |

Evaluation criteria
◎: Good
○: Average
X: Poor

As can be seen from the results of Table 5, the fat and oil composition for deep-frying obtained by the present invention improves the appearance of Tempura and improves the crisp.

What is claimed is:

1. A process for producing a fat and oil composition for deep-frying having a superior heat stability at 180 degrees C., including a step of adding at least one type of phosphorus-derived components selected from a crude oil and a partially refined fat and oil to a refined edible fat and oil so that a phosphorous content is 0.1 to 5.0 ppm.

* * * * *